May 15, 1934.  F. D. BENTZEL  1,958,464
CHECK WRITING MACHINE
Filed April 17, 1929   6 Sheets-Sheet 1

Fig.1.

INVENTOR
*Frank D. Bentzel*
BY
Rector, Hibben, Davis, & Macauley
ATTORNEYS

Fig. 2.

Fig. 6. SMALL ROLLER

Fig. 7. MEDIUM ROLLER

Fig. 8. LARGE ROLLER

May 15, 1934.   F. D. BENTZEL   1,958,464
CHECK WRITING MACHINE
Filed April 17, 1929   6 Sheets-Sheet 6

*Fig. 9.*

| LEDGER | | | | |
|---|---|---|---|---|
| NAME | DEDUCT | HOURS | GROSS | NET PAY |
| 1. John Doe | 0.75 | 48 | 93.75 | $*93.00 |

| | | | | |
|---|---|---|---|---|
| 1. John Doe | 0.75 | 48 | 93.75 | $*93.00 |
| 2. James Blank | 45.00 | 40 | 45.60 | $*00.60 |

BURROUGHS PAY CHECK

Pay to John Doe.

E X A C T L Y  $*93  D O L L A R S  .00  C E N T S  $*93.00

BURROUGHS PAY CHECK

Pay to James Blank.

E X A C T L Y  $*00  D O L L A R S  .60  C E N T S  $*00.60

A  } SUBTRACT NO ROLL
B  } NON ADD NO ROLL
C  } ADD NO ROLL
D  } SUB TOTAL SMALL ROLL
E  } SUB TOTAL MEDIUM ROLL
F  } SUB TOTAL LARGE ROLL
G  } TOTAL SMALL ROLL

INVENTOR
*Frank D. Bentzel*
BY
*Rector, Hibben, Davis & Macauley*
ATTORNEYS

Patented May 15, 1934

1,958,464

UNITED STATES PATENT OFFICE 1,958,464

CHECK WRITING MACHINE

Frank D. Bentzel, Detroit, Mich., assignor to Burroughs Adding Machine Company, Detroit, Mich., a corporation of Michigan Application April 17, 1929, Serial No. 355,725

13 Claims. (Cl. 235—58)

This invention relates to a checkwriting machine.

It relates particularly to a checkwriting machine that will not only automatically write a check after its amount has been entered on the keys of the machine, but also to one that will automatically print characters in the proper places to prevent figures being easily inserted to raise or change the amount of the check. The machine is also constructed so that it will accumulate the amounts of the checks and print a record of them. In addition, the machine may be used for bookkeeping functions such as ledger posting and for ordinary calculating functions, which functions may be performed either alone or in combination with the checkwriting operations.

The machine is particularly useful in payroll work although it is to be understood that this is merely one of its uses and that the description of this use is by way of illustration only. In making out payrolls it is frequently necessary to deduct items from the amount of an employee's pay and to issue a pay check for the net amount due. It is desirable to keep a record of these transactions in the nature of a ledger sheet for each employee. The present machine enables the payroll ledger to be posted, the various deductions being made and listed on the ledger sheet and the net amount of the check being calculated by the machine and printed on the ledger sheet, after which the machine operates automatically to write a check for this net amount. In the event it is not desired to perform ledger posting in connection with the writing of checks, the checks may be written by themselves, the machine acting under such conditions as a checkwriting machine only.

The general object of the invention is to provide an improved checkwriting machine.

A more particular object is to provide a checkwriting machine that will automatically print the amount of the checks at different places on a blank check.

A further object is to provide a checkwriting machine that will automatically print characters in places where no digits are printed to thereby avoid the possibility of the check being easily changed by placing figures in blank spaces.

A still further object is to provide a checkwriting machine that may also be used for ledger posting, the machine being constructed so that the performance of one set of these functions will not interfere with the action of the machine in performing the other set of functions.

Other objects and advantages of the invention will appear from the following specification and drawings.

An embodiment of the invention is shown in the accompanying drawings in which.

In order that the construction of the machine may be grasped more easily, an example of the work that may be done by it will be briefly described first.

Figure 9:
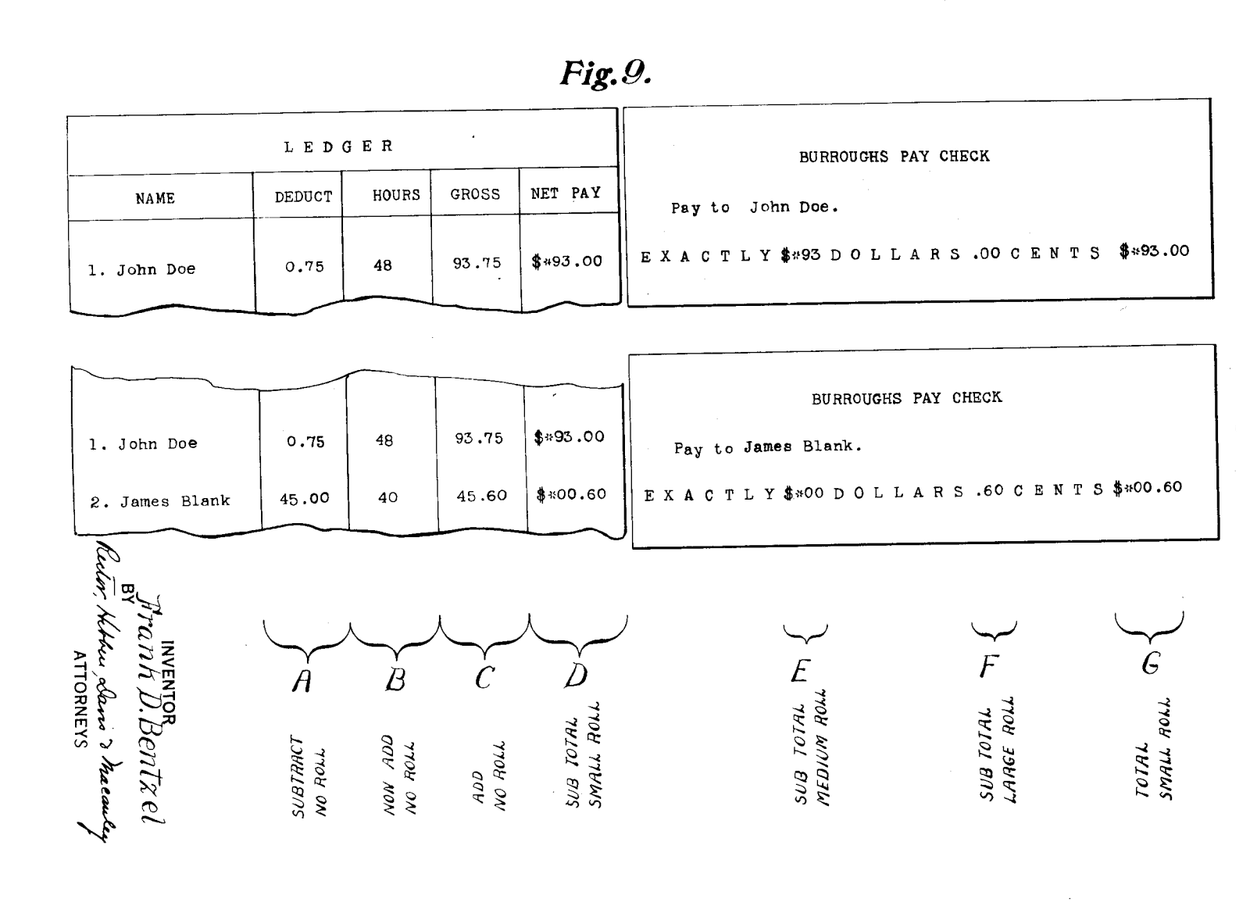
Fig. 9 illustrates samples of the work that may be done on the machine.

As previously mentioned, the machine is particularly useful in payroll work in which ledger sheets are posted and checks written. Two samples of work of this nature are illustrated in Fig. 9; one being a sample in which a check is written for ninety-three dollars and no cents and the other being a sample in which a check is written for no dollars and sixty cents. These two samples are chosen because they clearly bring out some of the features of the machine.

Referring to Fig. 9 and to the top sample of work, it will be observed that the first employee "John Doe" is to have seventy-five cents deducted from his pay. This is entered on the amount keys of the machine with the paper carriage in its "A" position after which the machine is conditioned for subtraction and operated, the machine being preferably motor operated and set into operation by depression of a motor bar. This results in printing the seventy-five cents in the "deduct" column and in subtracting it from the register of the machine, after which the carriage tabulates to its next position, to-wit, the B—C columns. The number of hours the employee has worked is then entered on the keys of a separate section of the machine and, at the same time the gross amount of the employee's pay, $93,75, is entered on the amount keys. The machine is then operated again which results in printing both the hours in the "Hours" column and the gross amount of the check in the "Gross" column. The number of hours is usually not accumulated in a register though it may be if desired but, in any event, the number of hours does not affect the condition of the register that receives the amount of the pay. In the example shown the gross pay $93.75 is added to the same register from which $0.75 was previously subtracted thereby leaving $93.00 in the register. The carriage then tabulates to its "D" position entitled "Net pay" where a subtotal is taken from the register and printed. This operation results in printing $93.00 in the "Net pay" column, the amount remaining in the register. It will be noted that two ciphers are printed to the right in the "Net pay" column in the cents orders. This is in line with the ordinary operation of a calculating machine which is usually arranged to print the ciphers to the right in all orders in which no digits are printed. There is nothing unusual about the above operations as such but, as will later appear, one of the points of the machine is that these operations may be carried on in the usual manner and at the same time the machine is capable of being used to write checks which requires operations that would normally interfere with ledger posting.

After the net pay of an employee has been determined and recorded on the ledger as above described, a check must be written for it. The present machine acts to write this check without requiring any further work on the part of the operator. In fact, when the machine is set into operation to print the amount of net pay on the ledger sheet it thereafter operates automatically to write the check and then returns to a condition for permitting posting of the pay of the next employee. When the machine is used for checkwriting only, the ledger posting operations above described are omitted and operations are started in the "D" position of the carriage.

The blank checks used have the words

"Exactly   Dollars   Cents"

printed on them with appropriate spaces left for the printing of the amounts of the checks. The names of the payees may either be already printed on the blank checks or when the invention is used with machines having typewriting attachments, the name may be typed on each check.

The machine operates first to print the amount of a check in dollars without printing its amount in cents, this operation taking place in the "E" position of the carriage. In the upper example illustrated in Fig. 9 the amount "93" is printed before the word "Dollars". It will be observed that there is also printed to the left of the amount "93" a dollar sign and an asterisk ($*) which two characters fill the space after the word "Exactly" and prevent checks being easily changed by simply inserting other digits before the amount "93". The dollar sign is always printed but the asterisk is only printed in the event there is a space to the left of the last digit representing the amount of the check in dollars. In the machine shown the capacity for checkwriting is $999.99 so that only one asterisk appears to the left of the amount "93" but it will be understood that if a machine of greater capacity were used two or more asterisks could be printed before the dollar sign in which event the blank checks used would have a correspondingly greater space left for printing.

The carriage then shifts to its "F" position where the amount of the check in cents is printed without printing the dollars. In the upper example illustrated there are no cents to be printed and the machine acts to print two ciphers to the right of the decimal point (.00), this result being accomplished by special mechanism hereinafter described.

The carriage then moves to its "G" position where the total amount of the check is printed at the right-hand end of the blank, this amount appearing in the upper example of Fig. 9 as $93.00 with an asterisk and a dollar sign to the left ($*93.00) to prevent the amount being readily changed.

After the total amount of the check is printed the carriage returns across the machine to the right to a position for a second operation.

In the event a check is to be made out for a certain number of cents without any dollars, the machine acts as illustrated for the lower example of work in Fig. 9. In this example, the employee has $45.00 deducted from his pay the gross amount of which is $45.60, leaving only $.60 as his net pay. The $.60 is printed in the "Net pay" column. In writing the check the dollars are entered as two ciphers with an asterisk and a dollar sign to the left of them ($*00). This fills in the dollar spaces to prevent the check being changed. The amount in cents is then printed as .60 after which the total amount of the check is printed as $*00.60. In this last operation, two ciphers, an asterisk, and a dollar sign are printed to the left of the last digit, that is, to the left of the 6 of the 60 cents. The printing of these characters is desirable in the writing of the check as will be readily appreciated, but it will also be clear that it is not desirable to have the machine print characters to the left in the ordinary calculating machine functions performed in connection with ledger posting. In other words, if the machine were constructed so as to always print ciphers to the left, such ciphers would appear in the "Deduct" and "Gross" columns as well as in other operations of the machine when it was being used as a bookkeeping or posting machine. The present invention comprehends a construction that enables the machine to print the ciphers to the left at the appropriate time when it is operating to write a check, but which does not cause it to print these ciphers when the machine is being used for ordinary posting operations. Accordingly, the machine may be used for checkwriting alone, it may be used for combined posting and checkwriting, and it may be used for posting and ordinary calculating functions without writing checks.

*General construction*

The machine employs, in its general construction, many of the parts of the well-known Burroughs calculating machine and, since these are well known in the art and described in numerous prior patents, the general feature of the machine will be only briefly described.

Figure 1:
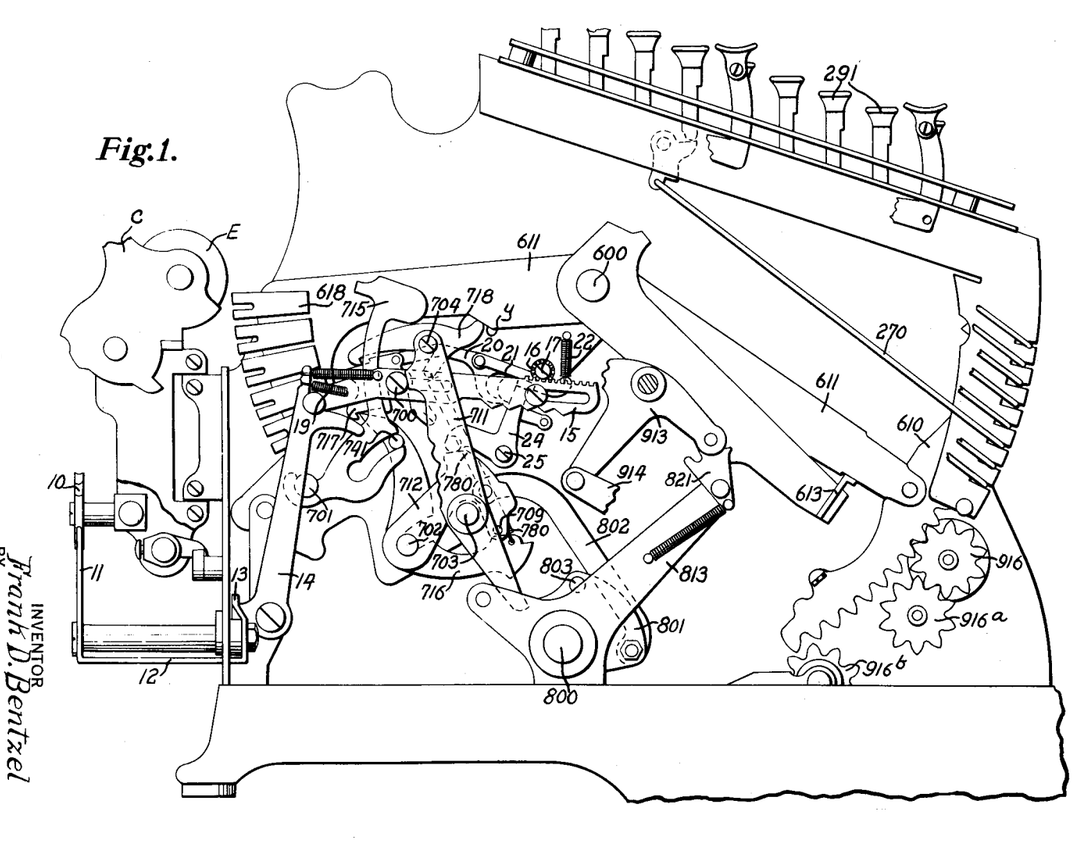
Figure 1 is a left side elevation of the machine with the casing removed showing some of the principal parts in normal condition.

Referring to Fig. 1, the machine is provided with a plurality of banks of amount keys 291, the number of banks being varied to suit the requirements, a desirable number being seventeen. Each of these amount keys controls a stop wire 270 that acts to differentially arrest the actuator rack 610 of its bank when the latter descends. Each actuator rack 610 is carried on the end of an arm 611 pivoted at 600 and normally held in the position illustrated in Fig. 1 by a bail 613 that is lowered during the forward stroke of the machine and raised during its return stroke. Positioned for cooperation with the actuator racks 610 is a register 916—916$^a$ that is rocked into and out of engagement with the racks at appropriate times to perform addition or subtraction and to enable totals and sub-totals to be taken, the familiar Burroughs total and sub-total keys being shown in Fig. 1. The register is rocked into and out of engagement with the actuator racks at appropriate times by means of an arm 813 that is oscillated at each operation of the machine. This arm carries a passby pawl 821 on its upper end which acts to rock a lever 913 to which is connected a pitman 914 that acts on the register frame to move the register into and out of engagement with the actuator racks. This is a well-known construction in the Burroughs machines and it is not considered necessary to describe it in detail.

Another set of registers 916$^b$ are associated with the actuator racks, there being a plurality of these registers movable longitudinally to permit any one of them to be selected for cooperation with the actuator racks. These multiple registers may be selectively brought into engagement with the actuator racks at the same time that the register 916—916$^a$ is acting in order that selected ones of the multiple registers may be used as grand totalizers or special totalizers for accumulating groups of figures that are entered in the machine or cleared out of the register 916—916$^a$. The multiple registers have suitable controls for enabling totals and sub-totals to be taken from them, and they may be brought into operation either manually or automatically, the details of the multiple register features not being described here as they are fully disclosed in Pasinski Patent No. 1,778,506.

The machine is provided with a traveling paper carriage C having a platen E, the carriage being provided with the usual line-spacing mechanism and being arranged to be automatically tabulated across the machine. This carriage receives the blank checks when the machine is being used as a checkwriting machine only. It also receives the ledger sheets and the blank checks when the machine is used for posting and checkwriting, and it receives the ledger or other work sheets when the machine is used for bookkeeping or calculating purposes. The carriage is provided with an automatic return feature, fully described in Rinsche Patent No. 1,580,534, which operates to automatically return the carriage across the machine and line-space it after the carriage reaches its limit of travel in one direction which limit may be varied to suit the requirements. The machine is also provided with an automatic repeat mechanism fully described in Muller Patent No. 1,397,774 which causes the machine to go through a series of operations automatically when it is set into operation in a predetermined column.

*Printing mechanism*

The printing mechanism is of the type illustrated in Burroughs Patent No. 505,078 with the improvements described in Putnam Patent No. 1,018,371. Briefly, the construction is as follows:

The arms 611 carrying the actuator racks 610 have a series of types 618 on their rear ends which are differentially positioned at the same time that the actuator racks are positioned. After a type is positioned, it is driven to printing position by a hammer 715 which strikes it after the arm 611 is arrested, there being a hammer 715 for each bank. The construction is such that, after an item is entered on the amount keys and as the machine is operated, the arms 611 in all banks in which keys have been depressed move to differential positions corresponding to the values of the keys, and the arms in the banks in which no keys were depressed move to a position that their "0" types are positioned for printing. Accordingly, when the printing mechanism is operated to fire the hammers 715, zeros (0) will be printed in all banks to the right of the left hand digit in which no amount key was depressed. Ciphers are not ordinarily printed to the left of the left hand digit because the printing mechanism is arranged so that the hammers in these banks are not fired.

The firing hammers 715 are pivoted at 701 and each is fired by means of its respective firing member 716 pivoted on a shaft 702 and urged counterclockwise by a spring 780. Each firing member is normally held against movement by a trigger 717 that hooks over the pointed upper end of said member as illustrated in Fig. 1. When the trigger for any bank is released, the firing member 716 for that bank is suddenly snapped counterclockwise by its spring 780 and a stud 741 on the firing member operating in a slot in the corresponding firing hammer 715 fires the hammer rearwardly. It will be noted that the slot in the hammer is enlarged near its inner end so that no camming action takes place at the end of the movement of the hammer, the momentum of the hammer being depended upon to carry it to printing position. This construction is for the purpose of permitting printing to be eliminated by controlling the movement of the firing members 716. It will be obvious that if these firing members are restrained from sudden movement and are allowed to move counterclockwise only gradually, the hammers 715 will not be given any momentum and they will not move to their final printing position. This action is called "walking out" the firing hammers and the construction involved is described in Putnam Patent No. 1,018,371.

The triggers 717 are released by means of their respective pawls 718 pivoted on a shaft 704 carried by the upper ends of two arms 711 that are pivoted on the shaft 703, one of said arms being illustrated in Fig. 1. The lower end of the arm 711 illustrated in Fig. 1 extends down into the path of a stud 803 on a plate 801 that oscillates with the shaft 800 and the arm 813. Near the end of each forward stroke of the machine, during which stroke the plate 801 moves counter clockwise, the stud 803 engages the lower end of the arm 711 to rock it clockwise to thereby carry the pawls 718 forward to release their triggers 717 by rocking them clockwise, thereby releasing the firing members 716 for action. This release occurs in all orders in which the arms 611 move to differential positions greater than their zero (0) position. In orders in which the arms 611 do not move farther than their zero position the tails of the latches 718 engage shoulders Y on the arms 611 before the triggers 717 are released and these shoulders act to cam the pawls 718 clockwise to move their hooked ends out of the paths of the shoulders on the triggers 717 so that the triggers in these orders are not released as the pawls 718 are moved forward. This prevents operation of the printing mechanism in all the banks in which no amount keys are depressed and hence no figures or ciphers are printed to the left of the left hand bank in which an amount key was depressed. Provision is made for causing ciphers to be printed in all orders to the right in which no amount key has been depressed this provision consisting of providing the triggers 717 with tails 9 (Fig. 5) which overlap to the right so that when the trigger in any order is released it will release all those to the right of it that are not released by their own pawls.

The firing members 716 are restored by a bail 709 (Figs. 1 and 3) carried by two side arms 712 pivoted on the shaft 702. One of the arms 712 is connected by a link 802 with the plate 801 that oscillates with the shaft 800. During the forward stroke of the machine the arms 712 are rocked counterclockwise which moves the bail 709 out of engagement with the tails of the firing members 716 so that they are free to move under the action of their springs 780 when the triggers 717 are released. During the return stroke of the machine the arms 712 are rocked clockwise during which movement the bail 709 engages the tails of the firing members 716 and moves them back to normal.

*Automatic control of printing mechanism*

The printing mechanism is automatically conditioned by the paper carriage to function in the required manner when printing checks and when being used for posting. This control partakes of some of the features of the control illustrated in Gascon Patent No. 1,395,991, but it differs therefrom in a number of particulars which enable the novel results to be procured that permit the machine to be used both for posting and for checkwriting.

Referring to Fig. 1, the carriage is provided with a plurality of rollers 10 of varying sizes which act on the arm 11 of a pivoted yoke 12 having another arm 13 connected to the pivoted member 14. Connected to the upper end of the member 14 is a link 15 in the form of a rack having teeth that mesh with a pinion 16 fixed to a cam shaft 17. The rack 15 is urged to the right as viewed in Fig. 1 by a spring 19 and it normally occupies its Fig. 1 position. When one of the rollers 10 engages the arm 11 the yoke 12 is rocked which in turn rocks the arm 14 counter-clockwise. This pulls the rack 15 to the left in Fig. 1 a distance corresponding to the size of the roller 10 that engages the arm 11, the rack preferably having four positions as indicated by the four notches in its lower edge with which a locking device cooperates to lock the rack in its various positions, said device not being illustrated in the present application, but being shown in the Gascon patent referred to. The shaft 17 carries a plurality of cams 18 best illustrated in Fig. 3, which, in different positions of the cam shaft, act on the printing mechanism in different orders as will be later described.

Figure 2:
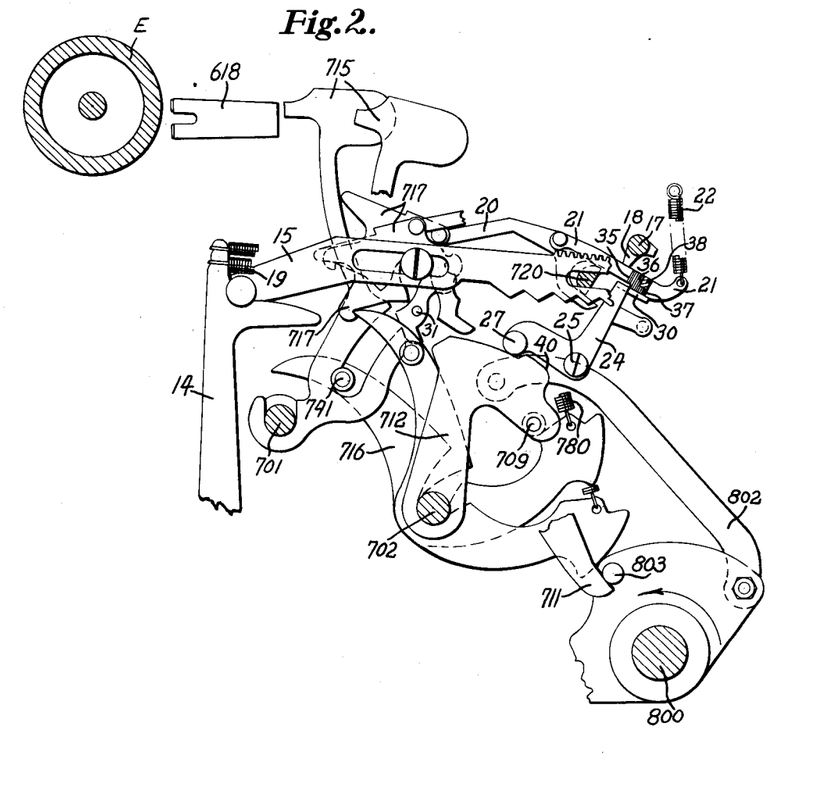
Fig. 2 is a partial left side elevation and section of the printing mechanism showing the position of the parts during the forward stroke of the machine and before the firing of the printing hammers in the dollars section.
Figures 3, 4:
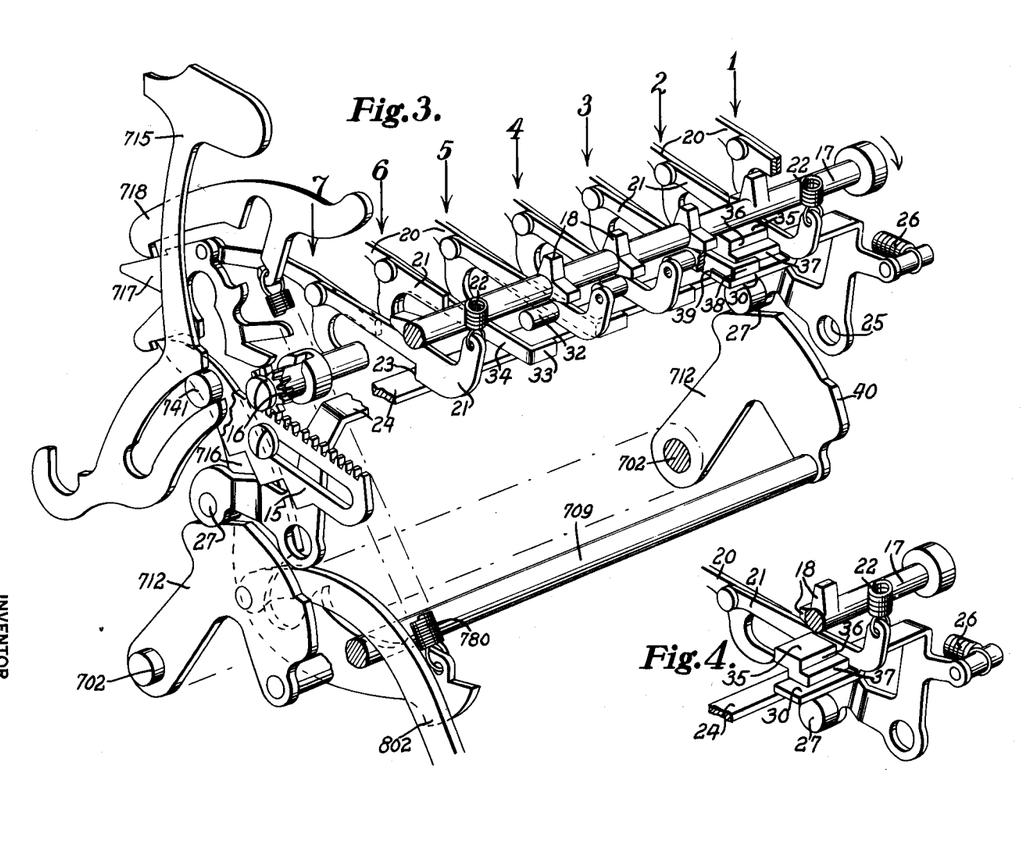
Fig. 3 is a perspective view of a portion of the printing mechanism of the machine, the parts being spread out to show the invention more clearly and being in normal condition.
Fig. 4 is a partial perspective of a portion of the printing mechanism illustrated in Fig. 3, Fig. 4 being enlarged to show the parts more clearly.

Each of the triggers 717 has a link 20 pivoted to it which extends forward, the forward end of each link being forked as illustrated in Figs. 2 and 3 and straddling a notched shaft 720 which serves to guide the links. Pivoted to the forward end of each of the links 20 in the seven right hand banks of the machine is a latch 21, each latch being urged counterclockwise by a spring 22. Inasmuch as some of the links 20 and their latches 21 are controlled differently than others, it will be necessary to distinguish between these elements for different banks which will be done by referring to them as being in the first, second, third, fourth, etc. banks of the machine, these banks being numbered for the purpose in Fig. 3.

When the machine is operated under normal conditions for ordinary calculating operations, the links 20 with their latches 21 move forward when their triggers 717 are rocked clockwise without affecting the printing mechanism in any special manner, said mechanism operating in the normal way to print the amount of each item entered and to print ciphers to the right in all banks in which no digit is printed.

In order to eliminate printing in certain banks of the machine, the shaft 17 is turned to cause the cams 18 on it to move selected latches 21 downwardly against the tension of their springs 22. When these latches are moved down the action is different in different banks but, for the present, a description of the action in the 7th bank will be sufficient. When the latch 21 in the 7th bank is depressed its shoulder 23 projects into the path of a bail 24 pivoted at 25 and urged counter-clockwise by a spring 26 (Fig. 3). Each of the arms of the bail 24 has a rearwardly extending projection carrying a stud 27 that is positioned to engage the cam edge of its respective arm 712. It will be recalled that the arms 712 are oscillated at each operation of the machine, their movement in Fig. 3 first being counter-clockwise from the position there shown and, after they have reached the limit of their movement in that direction, they are returned clockwise to their original position, it will, therefore, be clear that, as the machine operates, the bail 24 is rocked forward at the beginning of the forward stroke of the machine against the tension of its spring 26 and if any of the latches 21 have been pushed downwardly so that a shoulder or projection such as the shoulder 23 of latch 21 of the 7th bank is in the path of the bail, said latch will be pulled forward and it, in turn, will pull forward its link 20 and trip its trigger 717. This tripping action occurs at the beginning of the forward stroke of the machine because the bail 24 is rocked as soon as the arms 712 start counter-clockwise at the beginning of the forward stroke. Accordingly, the firing members 716 in the orders in which the latches 21 have been moved forward are released at the beginning of the forward stroke of the machine instead of near the end of it as in normal operations. The released firing members cannot immediately move to fire their hammers 715 because the restoring bail 709 has not yet moved upwardly to free them. The firing members can only move to firing position under the control of the restoring bail 709 which bail moves relatively slowly with the result that the firing members do not move their hammers 715 with sufficient force to give them enough momentum to effect a printing action. In other words, when one of the latches 21 is pulled forward at the beginning of the forward stroke of the machine, the printing mechanism for that bank is disabled and printing is eliminated. The elimination of printing through control of latches in this manner, such control being governed automatically by the carriage, is not new but the present invention comprehends controls for the printing mechanism involving these latches and they have been described in order that the invention may be clearly understood.

The further automatic control of the printing mechanism can be best understood by describing it with reference to the several operations that must be performed in checkwriting.

*Printing the amount of a check in dollars without printing the amount in cents*

The first operation in writing a check is to print the amount of the check in dollars before the word "Dollars" on the blank check. During this printing operation the amount of the check in cents must not be printed and provision must be made for filling the spaces to the left of the amount of dollars in order that the check may not be easily altered by simply inserting another figure before the digits that are printed.

In order to prevent the printing of the cents it is necessary to disable the printing mechanism in the cents orders of the machine. This might not be so difficult if it were the only thing involved but in order that the elimination of printing in the cents order may be accomplished while still permitting the machine to act in a special manner hereinafter described, the elimination must be accomplished in such a way that the remainder of the functions may be performed without difficulty.

Figure 5:
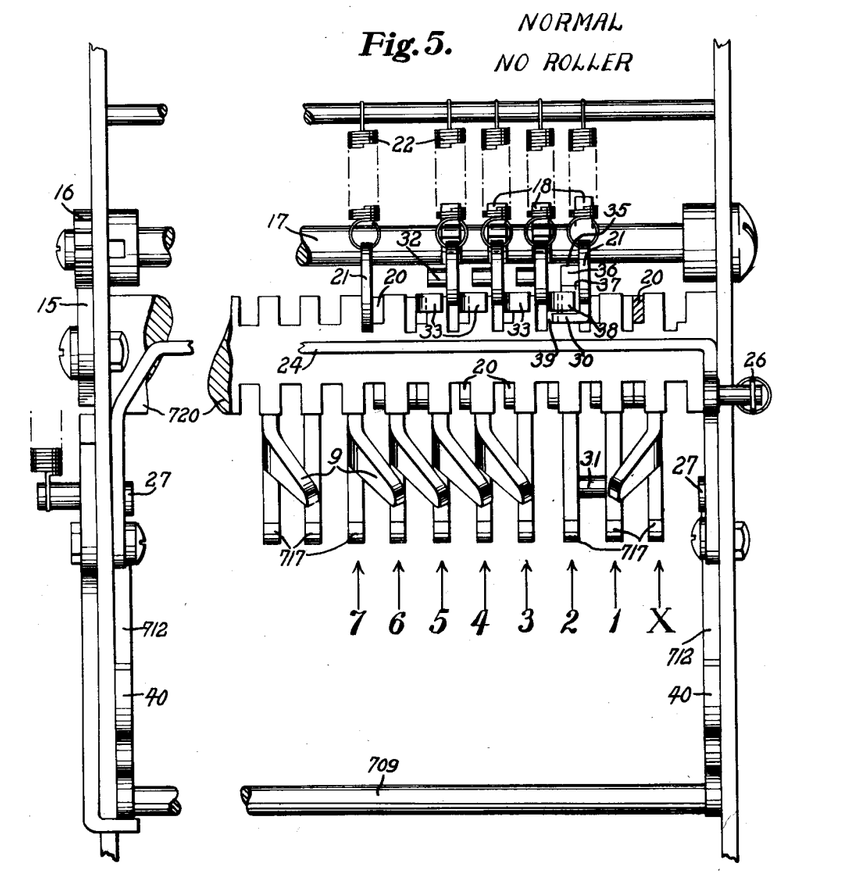
Fig. 5 is a front elevation of a portion of the printing mechanism showing the parts in the position they occupy during the normal condition as related to control by the carriage.
Figure 7:
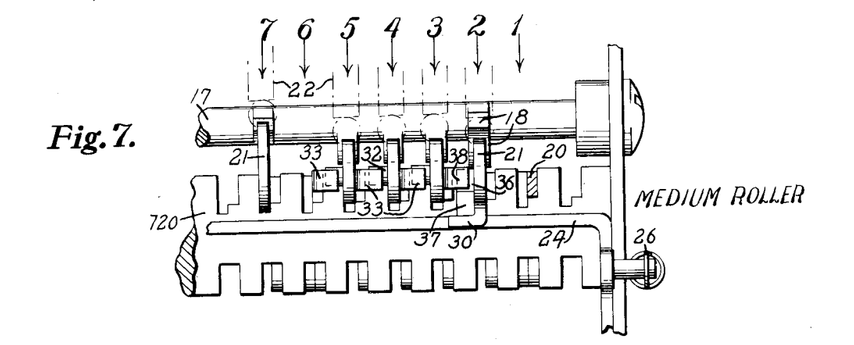
Fig. 7 is a partial front elevation similar to Fig. 5 showing the parts in the position they occupy when conditioned by a medium sized roller on the carriage.

When the paper carriage reaches its "E" position where the amount of the check in dollars is to be printed, a roll 10 on the carriage which, for the purpose of distinguishing it from other rolls will be called the "medium roll", acts through the connections heretofore described to position the shaft 17 a half revolution from its Fig. 1 position. This causes the cams 18 in the second, third, fourth and fifth banks to depress the latches 21 in said banks as illustrated in Fig. 7. The latch 21 in the second bank has a lateral lug 30 (Fig. 4) instead of a shoulder 23 adapted to be positioned in the path of the bail 24. The cam 18 in the second bank is of sufficient length to depress the latch 21 in said bank so as to position the lug 30 in the path of the bail 24 and hence, when the machine is operated, the latch 21 in the second bank will be moved forward and the hammer 715 in that bank will be "walked out" or disabled from operating effectively. Referring to Fig. 5, it will be noted that the triggers 717 in the first and second banks are connected together by a stud 31. Consequently, when the trigger 717 in the second bank is released as above described, the trigger in the first bank will be released also and this serves to eliminate printing in both the cents orders.

Referring to Fig. 3, the latches 21 in the third, fourth and fifth banks each carry a stud 32 adapted, under certain conditions to engage the laterally bent ends 33 of forward extensions 34 of the links 20 in the fourth, fifth and sixth banks. As shown in Fig. 7, the cams 18 on shaft 17 depress the latches 21 in the third, fourth and fifth banks and this depression is sufficient to position the studs 32 for engagement with the laterally bent ends 33 of extensions 34. When said latches are thus positioned, movement of any one of them forward causes the latches to the left of it, as viewed from the front, to be moved forward with it, the connection ending with the sixth bank in the machine illustrated. These particular latches do not have any provision for direct contact with the bail 24 as does the latch in the 7th bank.

In writing the upper check of Fig. 9, the type bars in the third and fourth banks are indexed to print the amount of the check in dollars (93) and the hammers in these banks are fired at the end of the forward stroke of the machine. The forward movement of the links 20 of said third and fourth banks during the firing operation results in moving the latches 21 of said banks far enough forward to also move the latches 21 in the fifth and sixth banks and hence printing occurs in the third, fourth, fifth and sixth banks. At the time the hammers are fired in the third, fourth, fifth and sixth banks the types in the third and fourth banks are indexed to their 3 and 9 positions, respectively. The types in the fifth and sixth banks are in what ordinarily correspond to their cipher positions but the type bars have been provided with an asterisk and a dollar mark respectively, instead of ciphers so that these characters are printed in the fifth and sixth banks instead of ciphers.

The result is, in the upper example of Fig. 9, that the amount of the check in dollars is printed and an asterisk and a dollar sign are printed to the left of it ($*93).

When the amount of the check is less than one dollar, as in the lower example of Fig. 9, the printing mechanism, as described so far, would not operate in the third, fourth, fifth and sixth banks because the actuator racks and type bars are not indexed. This would leave a blank space before the word "Dollars" on the check which would be highly undesirable. Special provision is made for printing characters in this space under these circumstances.

The forward movement of the latches 21 in the third, fourth, fifth and sixth banks, when the machine is in the condition under discussion, is controlled by the latch in the second bank but, instead of the control being for the purpose of disabling the printing in the third, fourth, fifth and sixth banks, it is for the purpose of enabling the printing to be accomplished in these banks.

As shown in Fig. 4, the lateral lug 30 on the latch 21 of the second bank is provided with a stepped plate 35 having an upper shoulder 36 and a lower shoulder 37. These shoulders are adapted to contact the laterally bent end 38 of the latch 21 in the third bank. This latch 21 in the third bank also has a shoulder 39 adapted to engage the lateral lug on the latch 21 of the second bank under certain conditions hereinafter described, but when the latch 21 in the second bank is moved down by the cam 18 illustrated in Fig. 7, the lug 30 is moved out of the path of the shoulder 39 and the shoulder 36 of the stepped plate 35 is moved down so that it is in position to contact the laterally bent end 38 of the latch 21 of the third bank. As illustrated in Fig. 3, the shoulder 36 is spaced from the bent end 38 of the latch 21 of the third bank so that forward movement of the latch 21 in the second bank together with its shoulder 36 does not immediately cause forward movement of the bent end 38 of latch 21 in the third bank. In fact, the forward movement of the bail 24 at the beginning of the forward stroke of the machine for the purpose of releasing the latches 21 to disable the printing mechanism in banks where the latches are depressed does not cause the shoulder 36 to engage bent end 38. The cam edges of the arms 712 which move the bail 24 first move it suddenly and they are then concentric with the pivot so that no further movement of bail 24 occurs during the major portion of the forward stroke of the machine. However, the forward ends of the cam edges of the arms 712 are provided with raised portions 40 which, near the end of the forward stroke of the machine, cam the studs 27 upward a slight additional distance which moves the bail 24 farther forward and this movement causes the shoulder 36 to engage the bent end 38 on the latch 21 in the third bank, which results in moving the latch in said bank forward far enough to trip its trigger. It will be recalled that the latches 21 in the third, fourth and fifth banks have been depressed far enough to position their studs 32 for contact with the bent ends 33 of the extension 34 of the links 20 in the fourth, fifth and sixth banks. Accordingly, when the latch 21 in the third bank is moved forward near the end of the forward stroke of the machine as above described the latches 21 in the fourth, fifth and sixth banks are also moved forward. This forward movement of the latches in the third, fourth, fifth and sixth banks does not occur until near the end of the forward stroke of the machine and at a time when the restoring bail 709 has moved far enough away from the firing members 716 to permit them to be moved by their springs when their triggers 717 are released. In fact, this forward movement occurs at substantially the same time in the operation of the machine as that in which the hammers 715 are ordinarily fired. The result is that the forward movement of the latches 21 in the third, fourth, fifth and sixth banks results in firing the hammers in said banks instead of disabling said hammers. In other words, connections are provided such that when the latch 21 in the second bank is depressed it disables the printing mechanism in the second and first banks but it enables the printing mechanism in the third, fourth, fifth and sixth banks in some or all of which latter banks the mechanism would normally be disabled in the position of the carriage under discussion. Expressed in a different way, it might be said that the disabling of the printing mechanism in the cents orders enables the printing mechanism in the dollars orders under conditions where said dollars order printing mechanism would be normally disabled.

In printing a check for a number of dollars less than ten, three characters must be printed in three spaces to the left of the amount of the check in dollars. In such event, a cipher is printed in the first bank to the left, an asterisk in the second and a dollar sign in the third. For example, if the check is for $9.00, the printing would be as follows: $*09.00. It would be possible, of course to print an asterisk in the first bank to the left if the type bar in said bank were provided with an asterisk instead of a cipher. The exact nature of the characters that are printed to the left can be varied to suit the requirements. The arrangement described for the present machine has been found suitable and it has been described as illustrative.

*Printing the amount of the check in cents without printing the dollars*

After the amount of the check in dollars has been printed without printing its amount in cents, the paper carriage moves over to its "F" column to position the check for printing in the space immediately before the word "Cents" on the check blank. In this position the machine operates to print the amount of the check in cents without printing its amount in dollars.

Figure 8:
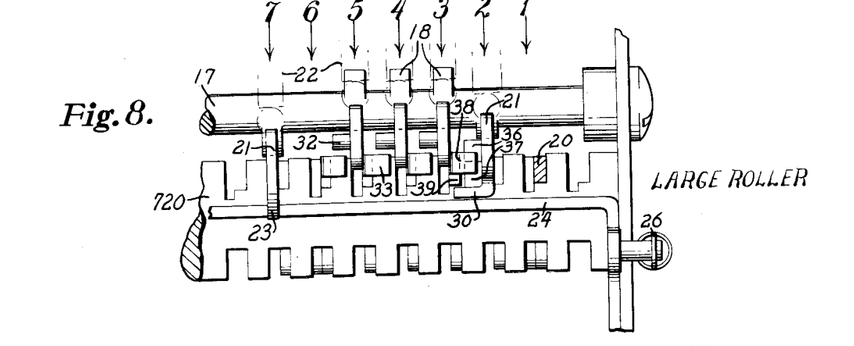
Fig. 8 is a partial front elevation similar to Fig. 5 showing the parts in the position they occupy when conditioned by a large sized roller on the carriage.

When the carriage is in its "F" position a "large" roller 10 operates the connections controlling the shaft 17 to cause it to be moved to a position three-quarters of a turn from its Fig. 1 position (see Fig. 8). In this position of the shaft 17, a cam 18 depresses the latch 21 in the seventh bank and this moves the shoulder 23 on said latch into the path of the bail 24 and hence the trigger 717 in said bank is tripped at the beginning of the forward stroke of the machine and the hammer 715 in said bank is "walked out". As shown in Fig. 5, the triggers 717 in the seventh, sixth, fifth and fourth banks have tails 9 which overlap the triggers to the right. Accordingly, when the seventh bank trigger 717 is tripped under the conditions above mentioned, the triggers in the sixth, fifth, fourth and third banks are likewise moved and hence the printing mechanism in all of said banks will be "walked out" and no printing of dollars or characters or ciphers will occur in said banks.

Also, in this position of the shaft 17, a cam 18 depresses the latch 21 in the second bank (Fig. 8) but the cam in this case is not as long as the cam that operates in said bank in the Fig. 7 position of the parts. The cam that operates in the Fig. 8 position is just long enough to move the latch 21 of the second bank down so that the lateral lug 30 on latch 21 will be below the shoulder 39 of the latch 21 of the third bank. As explained above, the trigger 717 of the third bank is tripped by reason of the overlapping tails between certain of the triggers 717 and, if the latch 21 of the second bank were not moved down so as to move its lug 30 out of the path of the shoulder 39, the latch 21 in the third bank, when moved forward by the tripping of its trigger, would move latch 21 of the second bank with it and disable the printing mechanism of the first and second banks.

The downward movement of the latch 21 in the second bank is not sufficient to position its lateral lug 30 in the path of the bail 24 and hence said latch is not moved forward by the bail. Accordingly, the printing mechanism in the cents orders, that is, in the second and first banks is left in normal condition and, when a check is to be printed that has a number of cents in its amount, the indexing of the type bars in one or both of the cents orders results in operating the printing mechanism in said orders and in printing the amount of the check in cents before the word "Cents" on the check.

Special provision is made for printing ciphers before the word "Cents" in the event the check is for a number of dollars without any cents. As explained above, the printing hammers in the dollars orders are disabled in the "F" position of the carriage and hence any provision that they might have for printing ciphers to the right would not be operative. In other words, the operation of the printing mechanism in the dollars orders cannot be depended upon to print ciphers in the cents orders when the carriage is in this position. Furthermore, there is no overlapping tail 9 between the right-hand dollars order and the left-hand cents order (Fig. 5). Also, when neither of the type bars in the cents orders are indexed, the printing hammers in said orders would not normally be fired. Accordingly, special provision must be made to operate the printing mechanism in the cents orders under these conditions.

The desired result is accomplished by providing an extra trigger 717 to the right of the first bank as shown in Fig. 5. This extra trigger has a tail 9 extending to the left instead of the right and overlapping the trigger 717 of the first bank. The special trigger has the usual elements of the printing mechanism associated with it and it is operated in the same way as the other triggers and its bank will be referred to as the "X" bank. Instead of being controlled by an actuator rack, it is controlled by the means for conditioning the machine for taking totals or sub-totals. In fact, the construction is like that described in White Patent No. 1,018,285 which relates to a special section of the printing mechanism used for character printing, except that no characters are placed on the type bar so that no printing takes place in the "X" bank. However, whenever the machine is conditioned for the taking of a total or a sub-total the special trigger 717 is released as for printing. When it is released it releases the trigger in the first bank and, since the triggers in the first and second banks are connected together, both the triggers in cents banks are released.

When the carriage is in the position for printing the amount of the check in cents only, i. e. the "F" position, it is conditioned for the taking of a sub-total because it is desired that the amount of the check remain in the machine in order that it may be printed in the next position of the carriage where the total amount of the check is printed. The conditioning of the machine may be accomplished by hand in the well known manner or automatically under the control of the carriage as described in Patent No. 1,854,216. This conditioning of the machine for a sub-total causes the printing mechanism in the cents orders to print ciphers in the event the check is for dollars only.

*Printing the entire amount of the check*

After the amount of the check in dollars and its amount in cents have been printed separately, the entire amount of the check is printed near its right-hand end in the usual place where figures representing the total of a check are written.

Figure 6:
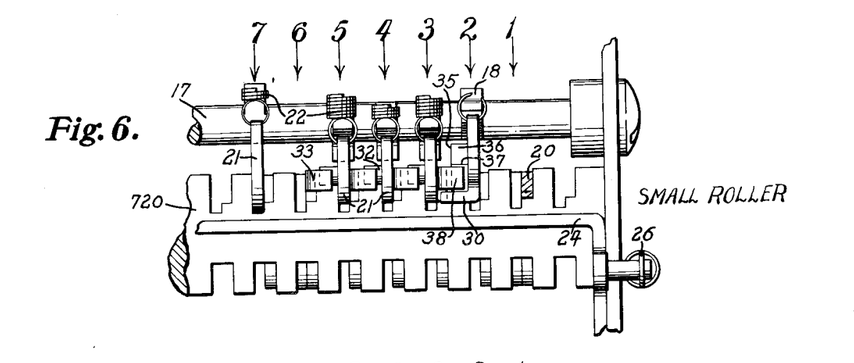
Fig. 6 is a partial front elevation similar to Fig. 5 showing the parts in the position they occupy when conditioned by a small roll on the controlling carriage.

When the carriage is in its "G" position which is the position for printing the total amount of the check, a "small" roll controls the connections for positioning the shaft 17, the control being such that said shaft occupies a position one-quarter of a turn from its Fig. 1 position. This position of the shaft is illustrated in Fig. 6 where it will be seen that three cams 18 depress the latches 21 in the third, fourth and fifth banks of the machine. This moves the latches in said banks down to a position such that their studs 30 are behind the bent ends 33 of the extensions 34 of links 20 in the fourth, fifth and sixth banks. If the check is for an amount in dollars, the printing hammers in the third, fourth, fifth and sixth banks will all be fired so as to not only print the amount of the check in dollars, but to print the characters to the left of the amount so as to fill all the spaces up to and including the sixth bank. For example, if the check is for $8.00, the movement of the trigger in the third bank near the end of the forward stroke of the machine and at the time the printing mechanism is to operate, will move the link 20 connected to said trigger forward and this will move the latch 21 of said bank forward. The stud 30 on the latch 21 of said bank engages the bent end 33 of the extension 34 of the latch 21 in the fourth bank to move it to release its trigger and the same happens for the fifth and sixth banks. The result is that $*08 is printed. In the upper example of Fig. 9, $*93 is printed.

If the check should happen to be for an amount in dollars without any cents, ciphers are printed in both cents columns. Referring to Fig. 5, it will be seen that there is no overlapping tail between the right-hand dollars trigger and the cents trigger. Consequently, ciphers will not be printed to the right by reason of overlapping tails on the 717 triggers. However, in such event the shoulder 39 on the latch 21 of the third bank engages the lateral lug 30 on the latch 21 of the second bank and this releases the trigger in the second bank at the same time that the triggers in the third, fourth, fifth and sixth banks are released. Inasmuch as the 717 triggers in the second and first banks are connected together, the triggers of both the cents orders are released along with the triggers in the dollars orders. Accordingly, when a check is for dollars only, ciphers will be printed in the cents orders. In addition to the above, the fact that the machine is conditioned for taking a total in the "G" column causes the trigger in the "X" bank to be tripped so that ciphers would be printed for this reason as well as for the reason above explained.

In case the check should be for an amount in cents without any dollars the type bars in the cents orders are indexed and the printing mechanism in said orders is fired at the end of the forward stroke of the machine. When this occurs the shoulder 37 (Fig. 4) engages the bent end 38 of the latch 21 of the third bank and this fires the printing mechanism in the dollars banks to print $*00.

*Operation of machine in writing checks*

When the machine is to be used for writing checks only, the blank checks are placed in the paper carriage, preferably toward the right-hand end. These blanks may be inserted one at a time or they may be in the form of a strip which enables successive checks to be brought into printing position very quickly by simply turning the platen of the paper carriage. The names of the payees may already be printed on the checks or, in the event the invention is used with a machine having a typewriter mechanism associated with it, the name may be typed on the blank.

After the blank has been placed in the carriage, the amount of the check is entered on the keys and the machine is given a stroke of operation with the carriage in its "D" position. This results in entering the amount of the check in one of the registers and the printing mechanism operates to print this amount, but since the check is not under the printing mechanism in this position, the amount is not printed on the check. If it is desired to keep a record of the amounts of the checks, a record strip may be placed in the machine in position to receive the impression of the printing mechanism during the above operation.

After the amount of the check has been entered as above described, the carriage tabulates to its "E" position where the machine is given another stroke of operation. In this position of the carriage the machine is in condition to take a sub-total either by hand or automatically through carriage controls so that when the machine is operated the amount of the check will remain in the register. Also, during operation of the machine in this position, the printing mechanism in the cents orders is disabled as previously explained with the result that only the amount of the check in dollars is printed. Characters will be printed to the left of the amount of the check in dollars and if there are no dollars in the check, the space for the dollars will be filled with characters which, in the lower example illustrated in Fig. 9, consists of dollar mark, asterisk and two ciphers.

After the machine has been operated in its "E" position, the carriage tabulates to its "F" position where the machine is again operated. Here again, the machine is conditioned for the taking of a sub-total in order that the amount of the check may remain in the register, advantage also being taken of this condition of the machine to cause ciphers to be printed in the cents orders when no digits are to be printed in said orders. In this position of the carriage the printing mechanism in the dollars orders is disabled as previously explained and the amount of the check in cents is printed after which the carriage tabulates to its "G" position.

In the "G" position the machine is conditioned for the taking of a total which results in clearing the amount of the check out of the register. It may be so conditioned by hand or it may be conditioned automatically through controls described in Patent No. 1,854,216. Also in this position of the carriage one of the multiple registers 916b may be brought into action so as to accumulate the total amount of each check to enable a grand total to be taken after the checks have been written. In fact, different ones of the multiple registers may be brought into position to accumulate different groups of checks if such operations are desired. These multiple registers may be brought into position by hand or automatically by connections described in Patent No. 1,911,768. When the machine is operated in the "G" position the total amount of the check is printed and characters are printed to the left of the amount. If the check is for less than $1.00, the dollar spaces are filled with predetermined characters which in the example illustrated are dollar mark, asterisk, two ciphers ($*00). If the check is for dollars only, two ciphers are printed in the cents orders in a manner heretofore explained.

After a check has been written as above described and its total amount printed at the right-hand end of the check, the carriage is automatically returned to its starting position where it is ready for the writing of a new check, the operations above described being repeated for each check.

The machine may be operated by hand in each of the positions above described but preferably provision is made for operating it automatically so that after the amount of the check is entered with the carriage in the "D" position, the rest of the operations take place automatically without requiring any attention on the part of the operator, the carriage returning to its original "D" position for the receipt of another check after each check is written.

After a series of checks have been written totals may be taken from the selected multiple registers in which the totals have been accumulated and a grand total of the amounts of the checks written may thus be obtained. If a record of the checks has been kept on a strip of paper in the "G" column, the grand total may be compared with a total taken of the list of checks on the record strip. In fact, if desired, the amounts of the checks may be accumulated in one register in the "D" column and in another register in the "G" column and the grand totals in these registers may be compared.

Ledger posting and checkwriting

The machine is particularly useful in payroll work where it is desired to post the payroll ledger at the same time the pay checks are written. When used in this work the machine operates as follows:

The paper carriage is wide enough to take a ledger sheet and a check as illustrated in Fig. 9. Operations start with the carriage in its "A" position of Fig. 9, the names of the various employees having already been entered on the ledger sheet in the order in which the checks are made out each time the payroll is made up or being typed when the machine has a typing mechanism. The "A" position of the carriage is the position where the items that are to be deducted from the employees' pay are to be listed. The machine is conditioned for subtraction either by hand or through a carriage control such as illustrated in Rinsche Patent No. 1,179,564, and the amount of the deduction is entered on the amount keys after which the machine is given a stroke of operation. This prints the deduction in the "Deduct" column and subtracts it on the register. The printing mechanism is in its normal condition during this operation, the shaft 17 being in the position illustrated in Fig. 1.

If the deduction is less than a dollar the printing hammers in the cents orders will be fired in the usual manner and the amount of the deduction in cents will be printed. In addition, one cipher will be printed to the left of the decimal point owing to the fact that, as the trigger 717 in the second bank of the machine is released, its link 20 and latch 21 are moved forward which causes the lower shoulder 37 of the stepped plate 35 to engage the bent end 38 of the latch 21 of the third bank so as to release the trigger 717 of the third bank. This does not release any of the triggers in the banks to the left because the stud 32 on the latch 21 of the third bank is above the laterally bent end 33 of the extension 34 of the link 20 of the fourth bank (Fig. 3).

If the deduction is for dollars only the correct number of dollars will be printed in the "Deduct" column as illustrated in the lower example in Fig. 9. None of the printing hammers in the dollars banks to the left will be operated other than those in which digits are to be printed, because the studs 30 on the latches 21 of the various dollars banks are above the laterally extending projections 33 of the links 20 of said banks. Ciphers will be printed in the cents orders owing to the fact that, as the latch 21 in third, or right-hand dollars bank moves forward, its shoulder 39 contacts the lug 30 on the latch 21 of the second bank. Accordingly, both of the triggers in the cents orders will be released, since they are connected together, and ciphers will be printed in the cents orders.

The machine then tabulates to its "B—C" position where the number of hours the employee works is entered in one section of the machine and the gross amount of his pay is entered on the amount keys in the calculating section. Inasmuch as the hour section is a separate part of the machine and does not affect the operation of the rest of it, it will not be described in detail, it being sufficient to know that when the hours are entered on the keys of the hour section they are printed in the "Hours" column when the machine is operated. In the "B—C" position of the carriage the printing mechanism is in normal condition the same as in the "A" position and the amount of pay is printed in a manner there described. This amount is added into the register, the machine being one that is normally in addition condition and one which automatically changes to this condition when it moves out of its "A" position. After the entry of the gross amount of the pay has been made, the register contains the net pay, and the next operation is to print the net pay in the "Net pay" column after which it is desired to write a check for this amount.

The carriage tabulates to its "D" position where it is conditioned for the taking of a sub-total. It may be so conditioned either by hand or automatically through carriage controls such as illustrated in Patent No. 1,854,216. Also, in this position of the carriage a "small" roll operates to turn the shaft 17 one-quarter of a revolution from its Fig. 1 position which results in depressing the latches 21 in the third, fourth and fifth banks as illustrated in Fig. 6. This is the same condition that the machine is in when it prints the total amount of the check and since this condition has been previously described it will not be repeated in detail here. When the machine is operated in its "D" position a sub-total is taken from the register and printed in the "Net pay" column, this sub-total in the upper example of Fig. 9 being $93.00. In this example, the operation of the printing mechanism in the two dollar orders where 93 is to be printed causes the characters to be printed in the two orders to the left ($*) due to the fact that the studs 30 on the latches 21 of the dollars orders are positioned to contact the laterally bent ends 33 of the extension 34 of the various links 20. Two ciphers will be printed in the "Cents" column.

When the net pay is less than a dollar the amount in cents is printed in the cents orders and two ciphers and two characters are printed in the dollars orders ($*00) this being due to the fact that, as the latch 21 of the second bank moves forward at the end of the forward stroke of the machine, its lower step 37 contacts the bent end 38 of the latch 21 of the third bank and moves that latch to release the trigger in the third bank, the triggers in the fourth, fifth and sixth banks being also released due to the fact that the studs 30 on the latches 21 are in position to engage the bent ends 33 of the extensions 34 of the links 20 in the fourth, fifth and sixth columns.

After the posting operations above described have taken place the machine goes forward automatically to write a check for the net pay.

Bookkeeping and calculating operations

As already explained, the machine is capable of writing checks separately and of posting ledgers and writing checks together. It can also be used for ordinary addition and subtraction as well as for bookkeeping functions of various kinds.

When the machine is being operated for calculations, bookkeeping work and the like, it operates in the same general manner as described for ledger posting. The nature of the operations may be different but the printing mechanism functions in the same way, that is, it functions to print ciphers to the right and it does not print ciphers to the left except in one condition, namely, where the item entered is entered in only the two right-hand banks, as for example, an entry of seventy-five cents. In such event, one cipher is printed to the right, but this is not objectionable.

When the machine prints a number such as $1000.00 it would appear as 1*00.00 and if an amount such as $10,000.00 were printed it would appear as 1$*00.00. However, the operator knows his machine and he knows that these characters are printed instead of ciphers so that this peculiarity does not interfere with the ordinary operation and is no handicap, particularly when it is taken into consideration that one machine may be used for writing checks as well as for ordinary operations. In other words, the economy effected by being able to use one machine for so many purposes outweighs any small inconvenience that might be occasioned by the printing of a dollar sign or an asterisk instead of a cipher in the few operations in which such characters appear.

Advantages

The advantages of the machine have been mentioned throughout the specification and are obvious from the description, but they may be briefly restated.

The machine may be used to write checks and it will operate automatically to do so. The amount of the check will be printed in different places on the blank check without requiring that the operator do any thing but enter the amount of the check on the keys. The printing automatically protects the check in that characters are printed to the left of the digits to guard against easy changing of the check by the insertion of numbers. At the same time that the check is being written its amount may be accumulated in a register which will totalize the amounts of all of the checks so that a grand total may be taken after the checkwriting operations have been completed. Separate groups of checks may be accumulated in different registers. Also, if desired, a record of the amounts of the checks may be kept.

In addition to being capable of use for writing checks, the machine may be employed to post a payroll ledger and write pay checks at the same time. The machine will function in both capacities without the one interfering with the other. When the posting is being done ciphers are printed to the right and when the checks are being written ciphers or characters are printed to the left, this change in the operation of the machine being controlled automatically and being made possible by certain novel features which have been described in detail.

The machine may be also used in ordinary work of addition, subtraction, bookkeeping, statistical work, etc., and it operates efficiently for this purpose even though it may also be used for checkwriting which requires different printing operations.

The economy of having one machine capable of all these various functions is obvious. Instead of having to have a calculating machine or a bookkeeping machine for ledger posting and other work and a separate checkwriter for writing checks, the same machine may be used for both and the two operations may be performed at the same time and this automatically.

It is to be understood that the construction shown is for purposes of illustration only and that variations may be made in it without departing from the spirit and scope of the invention as defined by the appended claims.

I claim:

1. A calculating machine having a traveling paper carriage, a calculating mechanism, a printing mechanism for recording calculations of said calculating mechanism, said printing mechanism being normally conditioned to print ciphers in all orders in which no digits are printed to the right of the highest order in which a digit is printed, and means controlled by said paper carriage acting to temporarily condition said printing mechanism to print characters in a predetermined number of orders to the left of the highest order in which a digit is printed.

2. A calculating machine having a calculating mechanism, a traveling paper carriage, a plural order printing mechanism operable during cycles of operation of the machine, said printing mechanism being normally conditioned to print to the right but not to the left of the last order on the left in which a digit is indexed, and automatic means controlled by said paper carriage acting to cause said printing mechanism, when operated in a predetermined columnar position of said carriage, to print characters to the left of the last order to the left in which a digit is indexed.

3. A calculating machine having a calculating mechanism, a plural order printing mechanism for recording calculating operations of said calculating mechanism, said printing mechanism being normally conditioned to print ciphers in all orders in which no digits are printed to the right of the highest order in which a digit is printed and being normally disabled from printing in all orders to the left of the highest order in which a digit is printed, and means for temporarily back-coupling certain orders of said printing mechanism to cause characters to be automatically printed in a predetermined number of orders to the left of the highest order in which a digit is printed.

4. A calculating machine having a calculating mechanism, a traveling paper carriage, a plural order printing mechanism for recording calculating operations of said calculating mechanism, said printing mechanism being normally conditioned to print ciphers in all orders in which no digits are printed to the right of the highest order in which a digit is printed and being normally disabled from printing in all orders to the left of the highest order in which a digit is printed, and means controlled by said paper carriage for automatically back-coupling certain orders of said printing mechanism to cause characters to be automatically printed in a predetermined number of orders to the left of the highest order in which a digit is printed.

5. A calculating machine having a calculating mechanism, a printing mechanism for recording calculations of said calculating mechanism, said printing mechanism being normally conditioned to print ciphers in all orders in which no digits are printed to the right of the highest order in which a digit is printed, special means for temporarily conditioning said printing mechanism to cause it to print characters in a predetermined number of orders to the left of the highest order in which a digit is printed, and means operable to cause ciphers to be printed in the two lowest orders of said printing mechanism when no items are entered in said lowest orders and no digits are printed in the higher orders.

6. In a calculating machine, a plural order registering mechanism, a total-taking means, a plural order printing mechanism, said printing mechanism being normally indexed and released during total-taking operations only in each order in which a digit is present with provisions, however, for printing ciphers to the right, means for disabling said printing mechanism in all orders except the two lowest orders, and means controlled by said total-taking means acting, while said printing mechanism is disabled as aforesaid, to enable the printing mechanism in the two lowest orders when a total is taken with no digits in the two lowest orders of the registering mechanism to thereby cause ciphers to be printed in said lowest orders.

7. In a calculating machine, a plural order registering mechanism, a total-taking means, a traveling paper carriage, a plural order printing mechanism including dollars and cents orders, said printing mechanism being normally indexed and released during total taking operations only in each order in which a digit is present with provisions, however, for printing ciphers to the right, means controlled by said paper carriage for disabling said printing mechanism in a given columnar position of said carriage in all orders except the cents orders, and means controlled by said total-taking means acting, while said printing mechanism is disabled as aforesaid in said columnar position, to enable the printing mechanism in the cents orders when a total is taken with no digits in the cents orders of said registering mechanism to thereby cause ciphers to be printed in the cents orders.

8. A calculating machine provided with a printing mechanism having a plurality of orders, each of which is indexed and released for operation by the entry of an item in the machine in its respective order, means for disabling the printing mechanism of a predetermined number of the lower orders, and means conditioned by the disablement of said banks of lower order of the printing mechanism for enabling the printing mechanism of a predetermined number of the higher banks that are not indexed and released by the entry of items.

9. A calculating machine provided with a printing mechanism having a plurality of orders including dollars orders and cents orders, each of which is indexed and released for operation by the entry of items in the machine in respective banks, means for disabling the cents orders of said printing mechanism, and means conditioned by the disablement of said cents orders printing mechanism for enabling a predetermined number of the dollars order printing mechanism when said dollars orders are not indexed and released by the entry of items.

10. A calculating machine having a calculating mechanism, a traveling paper carriage, a plural order printing mechanism including dollars orders and cents orders, said printing mechanism being operated during a cycle of operation of the machine and being normally conditioned to print to the right but not to the left of the last order on the left in which a digit is indexed, means for disabling the printing mechanism in the cents orders in a predetermined columnar position of said carriage, and means controlled by said carriage acting automatically to cause the printing mechanism to operate in predetermined dollars orders during a cycle of operation of the machine in a columnar position of the carriage where the cents orders are disabled and no digits are indexed in the dollars orders.

11. A calculating machine having a calculating mechanism, a traveling paper carriage, a plural order printing mechanism including dollars orders and cents orders, said printing mechanism being normally conditioned to print to the right but not to the left of the last order on the left in which a digit is indexed, and means controlled by said paper carriage acting to automatically disable the printing mechanism in the cents orders and to condition the printing mechanism in the dollars orders to print to the left of the last order on the left in which a digit is indexed even though no digits are indexed in the dollars orders.

12. A calculating machine having a calculating mechanism, a traveling paper carriage, a plural order printing mechanism including dollars orders and cents orders, said printing mechanism being operated during a cycle of operation of the machine and being normally conditioned to print to the right but not to the left of the last order on the left in which a digit is indexed, means controlled by said paper carriage automatically disabling the printing mechanism in the cents orders in a predetermined columnar position of said carriage, and means under the joint control of said carriage and said cents orders printing mechanism for causing the printing mechanism in the dollars orders to be operated during a cycle of operation in said columnar position even though no digits are indexed in the dollars orders.

13. A calculating machine having a calculating mechanism, a printing mechanism for recording calculating operations of said calculating mechanism, said printing mechanism being normally conditioned to print ciphers in all orders in which no digit is printed to the right of the highest order in which a digit is printed, special latches in different orders of said printing mechanism, means for conditioning the last latch of the highest cents order to cause it to disable the printing mechanism in the cents orders and to enable the printing mechanism in the higher orders regardless of whether or not said higher orders of said printing mechanism are indexed, said conditioning means also being operable to condition the latch in the highest cents order to cause cents to be printed without rendering the higher order printing mechanism operable, and special means for conditioning the cents orders to cause ciphers to be printed in said orders when no digits are entered in said cents orders.

FRANK D. BENTZEL.